(12) United States Patent
Bennett

(10) Patent No.: US 8,930,824 B2
(45) Date of Patent: Jan. 6, 2015

(54) FACILITATING PROPAGATION OF USER INTERFACE PATTERNS OR THEMES

(75) Inventor: Kris Bennett, Phoenix, AZ (US)

(73) Assignee: Apollo Education Group, Inc., Phoenix, AZ (US)

(*) Notice: Subject to any disclaimer, the term of this patent is extended or adjusted under 35 U.S.C. 154(b) by 379 days.

(21) Appl. No.: 13/007,511

(22) Filed: Jan. 14, 2011

(65) Prior Publication Data

US 2012/0011447 A1 Jan. 12, 2012

Related U.S. Application Data

(60) Provisional application No. 61/361,917, filed on Jul. 7, 2010.

(51) Int. Cl.
*G06F 3/0481* (2013.01)
*G06F 9/44* (2006.01)
*G06F 17/30* (2006.01)

(52) U.S. Cl.
CPC .......... *G06F 9/4443* (2013.01); *G06F 17/3089* (2013.01)
USPC ........... 715/745; 715/235; 715/744; 715/746; 715/747; 715/760

(58) Field of Classification Search
USPC .................. 715/235, 744, 745, 746, 747, 760
See application file for complete search history.

(56) References Cited

U.S. PATENT DOCUMENTS

| | | | |
|---|---|---|---|
| 2008/0148157 A1* | 6/2008 | Kamdar et al. | 715/747 |
| 2010/0211467 A1* | 8/2010 | Ramanathan | 705/14.72 |
| 2010/0218110 A1* | 8/2010 | Yao | 715/744 |
| 2011/0154187 A1* | 6/2011 | Sadowski et al. | 715/235 |

OTHER PUBLICATIONS

FreeMarker Manual http://www.freemarker.gov/docs/index.htm, snapshot of Jan. 11, 2010 downloaded from www.archive.org using the Wayback machine on Mar. 4, 2013.*
Freemarker Manual, "Old-Style Macro and Call Directives", website, http://freemarker.source.net/docs/ref_oldmacro.html., 2 pages, dated Mar. 5, 2011.
Yuimacros, "Zipscript, A Full-featured Expression Language and Java-based Multipurpose Evaluation Engine", Demonstration of Macros that wrap the Yahoo! UI Javascript library, website, http://code.google.com/p/zipscript/wiki/YUIMacros, dated Feb. 4, 2010, 2 pages.
Zipscript, "What is Javascript?", A Full-featured Expression Language and Java-based Multipurpose Evaluation Engine, website, http://code.google.com/p/zipscript/, 2 pages, powered by Google, last viewed Jun. 8, 2011.

(Continued)

*Primary Examiner* — Amy Ng
*Assistant Examiner* — Claudia Dragoescu
(74) *Attorney, Agent, or Firm* — Hickman Palermo Truong Becker Bingham Wong LLP

(57) ABSTRACT

A user interface architectural pattern for product/platform user experience is described. In an embodiment, a request associated with a first macro file is made. The first macro file refers to a second macro file, and includes one or more elements embedded in a wrapper associated with the second macro file. Based at least in part on the second macro file, a user interface component is generated.

22 Claims, 2 Drawing Sheets

(56) References Cited

OTHER PUBLICATIONS

Freemarker, "User Defined Directives as First-Class Citizens & Wrapper", website, http://freemarker.624813.n4.nabble.com/User-defined-directives-as-first-class-citizens-amp-WRAPPER-directive-td2221565., Dated May 18, 2010, 4 pages.

Freemarker, "Page Layout", website, http://freemarker.org/wiki/display/FM/page_layout, dated Jul. 20, 2006, 1 page.

Freemarker, "Supermanproject", Orangegears, Website, http://code.google.com/p/supermanproject/source/browse/trunk/freemarker/webapp/freemarker/macro.ftl?r=2, dated Jun. 6, 2010, 1 page.

The Template Toolkit, "Template," Manual Directives, website, http://template-toolkit.org/docs/manual/Directives.html#section_WRAPPER, dated Jul. 21, 2009, 41 pages.

surfspring.org, "Chapter 2, Beginning With Spring Surf Developer Tools: The Tutorial", Website, http://www.springsurf.org/sites/1.0.0.M3/spring-surf-devtools/spring-surf-roo-addon/reference/html/beginning.html, last accessed Jun. 8, 2011, 30 pages.

surfspring.org, "Chapter 2, Beginning With Spring Surf Developer Tools, 6 steps" The Tutorial, website, http://www.springsurf.org/sites/1.0.0.M2/spring-surf-devtools/spring-surf-roo-addon/reference/html/beginning.html#beginning-step-6., last accessed Jun. 8, 2011, 31 pages.

Spring Surf Project, "Project Pages", website http://www.springsurf.org/, last accessed Jun. 8, 2011, 2 pages.

Spring Source.org, "Spring Surf", Project Status: Incubator, website http://www.springsource.org/extensions/se-surf, 2 pages, last accessed Jun. 8, 2011.

* cited by examiner

FACILITATING PROPAGATION OF USER INTERFACE PATTERNS OR THEMES

CROSS-REFERENCE TO RELATED APPLICATIONS; BENEFIT CLAIM

This application claims the benefit of Provisional Appln. 61/361,917, filed Jul. 7, 2010, the entire contents of which are hereby incorporated by reference as if fully set forth herein, under 35 U.S.C. §119(e).

FIELD OF THE INVENTION

The present invention relates to user interface compatibility patterns and, more specifically, to techniques for causing content of a website to reflect a common pattern or theme.

BACKGROUND

Modern day websites are continually adding new features and functionality to satisfy the needs and desires of website users. For example, many large websites now include a social component that allows users to interact with one another, or a support component that allows users to interact with support personnel and track support requests.

Since many websites have similar needs as the requirements of the websites expand, a market for third-party web applications has flourished. Third-party application developers create these social components, support components, and other components as stand-alone applications that are ready to "plug-in" to any website. Third-party application developers often provide an entire application to the website administrator, developer, or other technical representative of the purchaser. The administrator installs the third-party application on a system that is under the control of the administrator, performs some basic configuration tasks, and then "links" to the third-party application from the main website.

Administrators or developers often further customize each application in order to present a common "look and feel" throughout the website. For example, control panels within a third-party application may be altered to have the same rounded corners and use the same colors as control panels in the main web site. This consistent user experience enhances the branding of the website, and helps the customer navigate new features by presenting new features in a familiar and site-consistent way.

As more and more third-party applications are added to a website, the complexity of that website increases. In order to present a consistent user experience between a main application and several third-party applications, each of the third party applications must be customized to match the user interface of the main application. Since each application has its own structure and nomenclature, this customization often involves changing the original source code of each third party application to match a template, theme, or macro used by the main website.

These customizations must be re-applied each time the website administrator upgrades to a new version of any of the third-party applications. The third-party application developers continue to use their own nomenclature, and updated files will overwrite the customized files, causing a reversion to the nomenclature of the third party application developer. Thus, administrators must re-customize any files that are updated as a result of a new release or version of a third-party application. For large applications, this may mean finding hundreds or thousands things that need to be customized or re-customized, and applying changes accordingly, each time an application is updated. As additional third-party applications are added to the main web site, the task of keeping up with version changes for all of the third-party applications is compounded.

Since each third-party application is tied to its own structure and nomenclature, every customization must be separately made to each application. For example, each application may include a control panel that allows the user to change profile settings for that application. The applications may have been customized for a particular web site such that each control panel has a blue background, as well as other common attributes. By customizing the control panels of all of the applications in the same way, users of the web site encounter a consistent look and feel as they navigate throughout the web site. If the administrator wishes to make changes to attributes of the various control panels used by the web site (e.g., change the background color to red), then the administrator must re-customize each third-party application separately.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
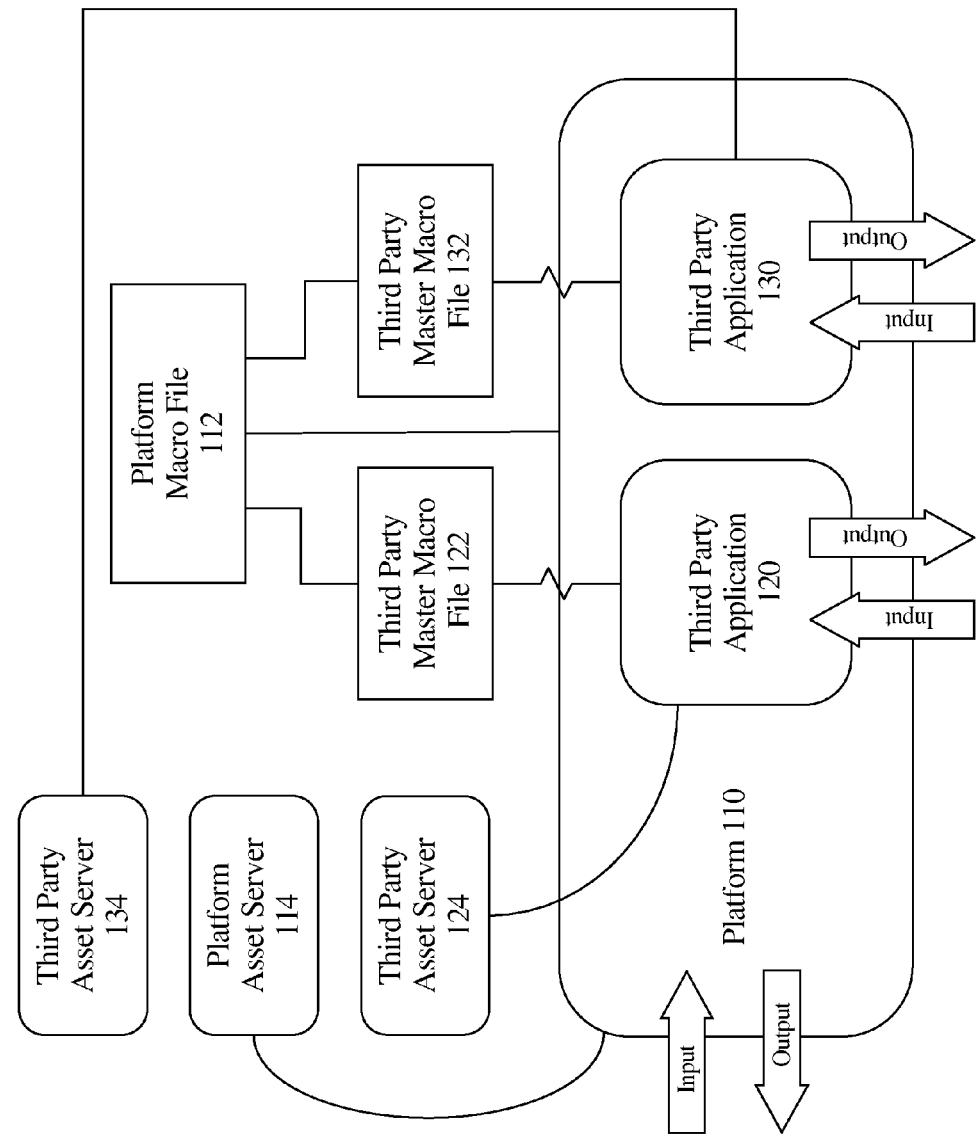
FIG. 1 illustrates a block diagram of a platform architecture upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Web page designers often integrate third-party applications into a website in order to extend the functionality of that website. However, third-party applications usually do not have the same look and feel (i.e., "branding") as the website, and therefore must be customized in order to create a consistent experience for users. For example, users do not distinguish between third-party applications that are integrated into a website, and expect user interface elements such as form fields to use the same colors and fonts throughout the website. Techniques are described herein for facilitating the customization of web sites that employ multiple applications. Rather than individually customizing each of the multiple applications in the same way, a single customization action causes a customization to be propagated across the multiple applications, normalizing site layout, styles, themes, naming conventions, and content management schemes, allowing all sites to work with the same assets, the same content management system, and the same content delivery network.

According to one embodiment, propagating a single customization action across multiple applications is accomplished by causing all applications to look to a single source that defines the elements and attributes of user interface components. This source is called a "master macro file". As shall be explained in detail hereafter, the master macro file is used to override, supplement, or replace user interface component definitions from other sources, such as macro files associated with third-party applications. For example, a third-party application may have a standard macro file that defines the way an error notification is presented to the user. Even though the standard macro file may require the error notification to use red text, the master macro file may force the error notification to use green text.

To accomplish this for a particular application, a special reference (referred to herein as a "wrapper") to the master macro file is inserted into the standard macro file that is used by the particular application. When the particular application receives a request to generate a web page, the application looks to the standard macro file to determine how to format a response to the request. Since the standard macro file has a reference to the master macro file, the application will use the instructions in the master macro file to format the response. Since many other applications may use the same technique, changes need only be made to the master macro file in order to propagate the changes to all applications.

In an embodiment, a request is handled by first looking into a first macro file (the standard macro file associated with a particular application). The first macro file refers to a second macro file (the master macro file), and includes one or more elements embedded in a wrapper associated with the second macro file. Based at least in part on the content of the second macro file, a user interface component is generated as a response to the request.

In an embodiment, the first macro file is associated with a third-party application and the second macro file is associated with a platform into which the third-party application is integrated. In an embodiment, the macro files include a plurality of macros generated by a template engine, and the user interface component is generated based at least in part on a macro in the second macro file.

Structural and Functional Overview

FIG. 1 is a block diagram of a platform 110 configured to facilitate cross-application customizations, according to an embodiment of the invention. Platform 110 generally represents a complete website that includes multiple applications. Platform 110 may include third-party applications, custom applications, and other custom software. All applications that are associated with Platform 110 are expected to deliver a homogeneous experience to the user in terms of look and feel.

Platform 110 may include one or more servers (not shown) and other applications capable of receiving input and generating output. Platform 110 provides a common environment for third-party applications, such as application 120 and application 130. Platform 110 may directly provide services to users of platform 110. For example, platform 110 may include one or more web servers that may provide web pages as output to users. These web pages may be static or dynamic. Platform 110 may also provide data to applications 120 and 130. For example, platform 110 may provide user authentication data to application 120, thereby allowing users of platform 110 to use a single username and password combination to log in to any application associated with platform 110. Application 120, for example, may detect that a user has already logged in to application 130 by using cookies or other authentication mechanism provided by platform 110, and skip the authentication procedures to create a more enjoyable experience for the user. In an embodiment, platform 110 does not directly provide services and applications to users. Instead, users directly interact with the applications rather than with platform 110 itself, while the applications interact with platform 110 in order to maintain a consistent look and feel across the applications, as shall be described in greater detail hereafter.

In the illustrated embodiment, application 120 and application 130 are capable of receiving input and generating output. Applications 120 and 130 may receive input from platform 110. Applications 120 and 130 may also generate output to platform 110, in an embodiment. Thus, platform 110 may serve as an intermediary to applications 120 and 130. For example, users may interact directly with the platform and, in response to those interactions, the platform interacts with the applications on behalf of the users.

Although more than two third-party applications are depicted in FIG. 1, the techniques described herein may be employed in any system that has one or more applications. For example, the techniques may be used both in situations where there is a single third party application, and in situations where there are significantly more than two third party applications. There are no inherent limits on the number of applications that may be integrated into or associated with platform 110.

In the embodiment illustrated in FIG. 1, the platform and each of the applications are associated with a corresponding master macro file. Specifically, application 120 is associated with master macro file 122, application 130 is associated with master macro file 132, and platform 110 is associated with platform macro file 112. In addition, master macro files 122 and 132 require the inclusion of platform macro file 112 in an embodiment. For example, master macro files 122 and 132 may have instructions that are incomplete, and that require platform macro file 112 in order to be complete. An inclusion reference in master macro files 122 and 132 may "point" to the location of platform macro file 112. As shall be described in greater detail hereafter, master macro files 112, 122 and 132 are generated using a template engine, according to an embodiment.

Master Macro Files

According to one embodiment, master macro files, such as such as master macro files 122 and 132, define the way web pages and individual web page elements are presented to users. Platform macro file 112 is also a master macro file, but is referred to herein as platform macro file 112 in order to clarify that platform macro file 112 is used as a superseding master macro file. Master macro files store sets of instructions called macros. Macros are rules or patterns that specify how certain input sequences should be mapped to output sequences. A master macro file contains one or more macros, each of which define the way a particular web page or web page element should be generated. For example, the following macro may be stored in a master macro file along with other macros:

```
<#macro hello>
    <font size="+5">Hello World!</font>
</#macro>
```

This creates a macro variable called "hello." When invoked, the "hello" variable generates a large "Hello World!"

on the screen. The way to invoke this variable in an embodiment is to place a reference to the variable in a template file that defines the structure of a web page. For example, the following reference may be placed in a template file to cause "Hello World!" to be generated:

<@hello/>

Macros may also use parameters, thereby allowing macros to be used to generate dynamic content. For example, the "hello" macro above could be modified to include a "namevar" parameter as follows:

```
<#macro hello>
    <font size="+5">Hello ${namevar}!</font>
</#macro>
```

This macro may be used as follows:

<@hello namevar="Kris"/>

Instead of a large "Hello World!," invoking the "hello" macro will cause "Hello Kris!" to be printed on the screen. Macros may include loop variables and other more advanced programming structures. Any number of parameters may be used in a macro, and any number of macros may be contained in a master macro file. Macros may be included in template files; However, template files will be discussed separately to avoid blurring the distinction between macros and more typical templates, which are described in more detail below.

Template Engines

Applying the Model/View/Controller (MCV) architectural pattern to dynamic Web pages involves separating the designers (HTML authors) from the programmers. Designers may change the way a web page looks without requiring programmers to change or recompile code, because the application logic and page design are separated.

Template engines allow developers and designers to separate the design aspect of web application development from the data manipulation aspect. As used herein, the term "template engine" generally refers software that is designed to process web templates and content information to generate web documents. According to one embodiment, template engines are used to create templates and master macro files. A macro may be created for each type of user interface element in a web page. For example, a control panel, dialog box, form input field, or any other element may be defined by a macro in a master macro file.

Template engines assist designers in the creation of the "view," which renders the model into a form that the user will interact with. The model manages information and provides information to observers when the information is required. A controller accepts input from users and provides instructions to perform based on the input.

The "view" is referred to herein as a "template." The simplest form of a template is an HTML file that requires no processing by a template engine. To provide dynamic content, templates may include special instructions that are interpreted by a template engine. For example, the use of a macro file as described in the preceding section may be implemented in a template:

<@hello namevar="Kris"/>

One example of a template engine is FreeMarker. FreeMarker is based on the Java programming language, and is often used to generate templates for servlet-based web applications. The templates define the design of an application. In the case of servlet-based web applications, Java servlets make up the application logic. An example template created using FreeMarker may look like:

Code Listing 1 - Example Template

```
<html>
<body>
<p>Hello ${name}! You have the following items in your shopping cart:
<#list products as p>
    <p><b>${p.name}:</b> ${p.price}</p>
</#list>
</body>
</html>
```

Once this template is processed by FreeMarker, the output may look like:

Code Listing 2 - Example Template, Processed

```
<html>
<body>
<p>Hello Kim! You have the following items in your shopping cart:
    <p><b>Paper:</b>$3.35</p>
    <p><b>Pencils (12-pack):</b>$2.50</p>
    <p><b>Eraser:</b>$1.05</p>
</body>
</html>
```

The variables such as name, p.name, and p.price may come from any data source. Therefore the designer may focus on the presentation of the data.

User Interface Customization

A web application platform such as platform 110 may use a master macro file, generated by a template engine, which defines a desired user interface design for the platform 110. In addition, each third-party application that is integrated into platform 110, such as applications 120 and 130, may be associated with a respective master macro file generated by a template engine.

A designer that is pleased with the functionality of application 120 may nonetheless wish to make application 120 conform to the design standards of platform 110. For example, application 120 may include a control panel that does not conform to the design standards of platform 110. As another example, application 120 may not be designed for use with browsers that are HTML 5 compatible. One way to force compliance is to alter the source code of application 120. However, once the application is upgraded, all changes may be lost. In addition, changes will need to be made to each application for which compliance is desired.

In an embodiment, the developer of application 120 or another developer adds a "wrapper" to one or more sections of master macro file 122. In addition, a reference to platform macro file 112 is added to master macro file 122. Using FreeMarker, this is accomplished by using the #import statement. For example, if platform macro file 112 is named apollogrpUI.ftl, and is found in directory /WEB-INF/site/libs/, then an appropriate FreeMarker import statement would be: <#import "/WEB-INF/site/libs/apollogrpUI.ftl" as apollogrpUI/>. Although this specification refers to the use of the FreeMarker template engine, this method may be applied using other template engines that are capable of importing macro files.

In an embodiment, the wrapper may replace <div> tags having class attributes (e.g., class="classname") in master macro file 122 by incorporating the class attribute in the wrapper tag. For example, <div id="abc-sidebar abc-sidebar-actions" class="abc-sidebar abc-sidebar-actions"> </div> may be replaced with the wrapper <@apollogrpUI.panel type="${type}" id=" " class="abc-sidebar abc-sidebar-actions" style=" "> </@apollogrpUI>. By using wrappers that refer to the apollogrpUI platform macro file 112, the apollogrpUI macros may be used to override the characteristics defined in master macro file 122.

The initial reference to master macro file 122 may be made in a template associated with application 120 by using an "import" statement. To illustrate the use of an import statement, it will be assumed that application 120 is developed by a fictitious company named ABC Enterprises and the developer of platform 110 is a company named Apollo Group, and naming conventions discussed herein may identify these companies. If master macro file for application 120 is named abcUI.ftl, and is found in directory /WEB-INF/site/libs/, then the import statement would look like: <#import "/WEB-INF/site/libs/abcUI.ftl" as abcUI/>. The relevant portion of the template calling the abcUI macro may look like the following:

---
Code Listing 3 - ABC Front End Code
---
<#import "/WEB-INF/site/libs/abcUI.ftl" as abcUI/>
<!-[PANEL COMPONENT BEGINS]-->
    <@abcUI.renderProgramSidebar 'program-status' />
<!--[PANEL COMPONENT ENDS]-->
---

The <@abcUI.renderProgramSidebar 'program-status'/> tag makes a call to the renderProgramSidebar macro in the abcUI macro file. Although a portion of an example abcUI.ftl macro file was discussed above, an expanded version is listed below:

---
Code Listing 4 - Portion of ABC Master Macro
---
<#import "/WEB-INF/site/libs/apollogrpUI.ftl" as apollogrpUI/>
<#macro renderProgramSidebar componentName container=''>
  <!--[ Panel Component Begins ]-->
<@apollogrpUI.panel type="${type}" id="" class="abc-sidebar abc-sidebar-actions" style="">
    <@apollogrpUI.panelHeader type="" id="" class="abc-sidebar-header" style="">
        <@apollogrpUI.panelLinks id="" class="" style="">
        Links
        </@apollogrpUI.panelLinks>
    <@apollogrpUI.panelTitle id="" class="" style="">
    <!--[Panel Title Begins]-->
        Panel Title
    <!--[Panel Title Ends]-->
        </@apollogrpUI.panelTitle>
    </@apollogrpUI.panelHeader>
    <@apollogrpUI.panelBody id=" " class="abc-sidebar-body abc-sidebar-body-actions" style="">
        Body Content
    </@apollogrpUI.panelBody>
</@apollogrpUI.panel>
<!--[ Panel Component Ends ]-->
</#macro>
---

Since the template file (code listing 3) imports the abcUI macro file (code listing 4), the template is interpreted in light of the abcUI macro file. The template calls the renderProgramSidebar macro, which includes everything between <#macro renderProgramSidebar componentName container=' '> and </#macro>. Since everything between <#macro renderProgramSidebar componentName container=' '> and </#macro> is wrapped in tags that refer to @apollogrpUI, the apollogrpUI master macro file will be used to interpret the macro. This is one example of a first macro file, such as master macro file 122, importing a second macro file such as platform macro file 112. In this embodiment, the ABC macro file (abcUI.ftl), which includes wrappers, imports the Apollo Group macro file (apollogrpUI.ftl) using the #import statement.

The abcUI macro file includes sections that have been truncated for convenience. The "Links," "Panel Title," and "Body Content" sections may be expanded to include more text, and formatted data, and are placeholders that will be used in a later example. The "Body Content" section, for example, may include an unordered list of hyperlinks with icons next to each item in the list.

An example apollogrpUI.ftl file (platform macro file 112) is shown below:

---
Code Listing 5 - Example Apollo Group Master Macro File
---
<!-[PANEL COMPONENT BEGINS]-->
[#macro panel type="" id="" class="" style="" ]
    [#if type == 'panel2']
[#assign panelstyle="librarygroup mycoursespanel"]
    [/#if]
    <div class="at-panel [#if type?has_content]${panelstyle}[/#if] ${class}">
        [#nested]
    </div>
[/#macro]
[#macro panelHeader type="" id="" class="" style=""]
    <div class="hd [#if class?has_content]${class}[/#if ] " style="">
        [#nested]
    </div>
[/#macro]
[#macro panelTitle id="" class="" style=""]
    <div class="[#if class?has_content]${class}[/#if] title">[#nested]</div>
[/#macro]
[#macro panelLinks id="" class="" style=""]
<div class="[#if class?has_content]${class}[/#if] panel-right">
        <div id="${id}" class="panel-links[#if class?has_content] ${class}[/#if]" [#if style?has_content]style="${style}"[/#if]>
            [#nested]
        </div>
</div>
[/#macro]
[#macro panelBody id="" class="" style=""]
    <div class="bd [#if class?has_content]${class}[/#if]">
        [#nested]
    </div>
[/#macro]
[#macro panelFooter id="" class="" style=""]
    <div class="ft [#if class?has_content]${class}[/#if]">
        [#nested]
    </div>
[/#macro]
<!--[PANEL COMPONENT ENDS]-->
---

The panel type is not "panel2," so the [#if type=='panel2'] statement for the "panel" macro in the apollogrpUI master macro file fails, defaulting to the panel "at-panel." The [#if class?has_content]${class}[/#if] statements cause the macro to import the class that is passed through from the abcUI macro file, if a class exists. Since the [#if class?has_content]${class}[/#if] statement is found in the macro for "at-panel," the class in class="abc-sidebar abc-sidebar-actions" from the abcUI file will be passed through to the apolloUI macro. The resulting browser code derived from this line of code, as interpreted using the abcUI master macro file in conjunction with the apollogrpUI master macro file, is <div class="at-panel abc-sidebar abc-sidebar-actions">. Similarly, ${type} allows any deisign type of the panel to be defined in the apollogrpUI macro and #nested allows for any information in the middle of the abcUI macro to come directly into the apollogrpUI macro. To allow developers to define any panel type, developers may use ${panelstyle}. Developers may reference PANEL1, PANEL2, PANEL3, and so on, which assigns a class name in the apollogrpUI macro to change the view of the panel. This is shown in the apologrpUI macro.

A merger of the abcUI macro and the apollogrpUI macro results in the following combined macro view or pseudo-macro:

Code Listing 6 - Example Combined Macro

```
<!--[PANEL COMPONENT BEGINS]-->
<!-- [Default Panel Begins]-->
<div class="at-panel [#if type?has_content]${panelstyle}[/#if] ${class}">
    <div class="hd [#if class?has_content]${class}[/#if]">
        <div class="panel-right">
            <div class="panel-links [#if class?has_content]${class}[/#if]"> [#nested]</div>
        </div>
        <div class="title [#if class?has_content]${class}[/#if]">
[#nested]</div>
    </div>
    <div class="bd [#if class?has_content]${class}[/#if]">
        [#nested]
    </div>
</div>
<!-- [Default Panel Ends]-->
<!--[PANEL COMPONENT ENDS]-->
```

Code listing 6 represents a custom condensed view of the apollogrpUI macro file, taking into consideration the requirements of the ABC front end code. For example, the macro for panel2 (from apollogrpUI) is not shown, since a determination was made that the panel was not of the panel2 type. In addition, [#nested] is used only where it is required. For example, since "Links," "Panel Title," and "Body Content" represent the only nested content, the macro file shows [#nested] only in those sections.

When the abcUI macro (code listing 4) is applied to the pseudo-macro of code listing 6, the following ABC browser code is generated:

Code Listing 7 - Example Browser Code Based On Macros

```
<!--[ Panel Component Begins ]-->
<div class="at-panel abc-sidebar abc-sidebar-actions ">
    <div class="hd abc-sidebar-header ">
        <div class="panel-right">
            <div class="panel-links">
            Links
            </div>
        </div>
    <div class="title">
    Panel Title
    </div>
    </div>
    <div class="bd abc-sidebar-body abc-sidebar-body-actions ">
        Body Content
    </div>
</div>
<!--[ Panel Component Ends ]-->
```

Wrapper <@apollogrpUI.panel type="${type}" id=" " class="abc-sidebar abc-sidebar-actions" style=" "> in code listing 4 is converted to <div class="at-panel abc-sidebar abc-sidebar-actions"> in code listing 7. Wrapper <@apollogrpUI.panelHeader type=" " id=" " class="abc-sidebar-header" style=" "> in code listing 4 is converted to <div class="hd abc-sidebar-header"> in code listing 7. Wrapper <@apollogrpUI.panelLinks id=" " class=" " style=" "> in code listing 4 is converted to <div class="panel-links"> in code listing 7. Wrapper <@apollogrpUI.panelTitle id=" " class=" " style=" "> of code listing 4 is converted to <div class="title"> in code listing 7. Wrapper <@apollogrpUI.panelBody id=" " class="abc-sidebar-body abc-sidebar-body-actions" style=" "> of code listing 4 is converted to <div class="bd abc-sidebar-body abc-sidebar-body-actions"> in code listing 7.

By wrapping elements of the abcUI macro file with code that references the apollogrpUI macro file, the "wrapped" elements are generated based at least in part on the apollogrpUI macro file, which may completely override the class names and other attributes of the wrapped elements. For example, the apollogrpUI macro file may leave out the [#if class?has_content]${class}[/#if] statement, thus completely changing the class name while leaving no remnants of the old class name. Attributes may be added upon, overridden, ignored, or left alone by the apollogrpUI macro file.

In an embodiment, the above-described procedure is used to allow the administrator of platform 110 to control the view of user interface elements generated by application 120 through platform macro file 112. The developer of application 120 or another developer with access to master macro file 122 may add wrappers to user interface elements and other elements in master macro file 122 used to display information for application 120. Each wrapper applied to master macro file 122 will reference a macro in platform macro file 112. The administrator or developer of platform 110 may then change each macro in platform macro file 112 as needed, thereby controlling the view of application 120 without changing any code associated with application 120. In addition, changes made to application 120 using platform macro file 112 are reflected in platform 110, as platform 110 is associated with platform macro file 112.

In an embodiment, the administrator or developer of platform 110 may control the view of user interface elements generated by application 130 through platform macro file 112. The developer of application 130 or another developer with access to master macro file 132 may add wrappers, such as those added to master macro file 122, to user interface elements and other elements in master macro file 132 used to display information for application 120. In this embodiment, changes made to platform macro file 112 allow for single-point customization of platform 110, application 120, and application 130 without requiring the customization of application 120 and application 130 by the administrator of platform 110.

If the application developers for applications 120 and 130 provide the wrappers in each product release or update, very few changes, if any, will need to be made by the administrator of platform 110 when application 120 or application 130 is upgraded. This is because the wrappers will ensure that full control of the view of the application is handled via platform macro file 112, which is not part of application 120 or application 130. Updates may be made to macro file 122, however. For example, an upgrade release of application 120 may include a new panel or other object that is not defined in platform macro file 112. However, it is a relatively simple operation to add a new panel type or other element type to platform macro file 112 when compared to the alternative: customization of hundreds or thousands of lines of code each time a new release is provided by a third-party application developer.

In an embodiment, a user of platform 110 provides input to platform 110 in the form of a request for a web page. Platform 110 returns a web page that includes one or more user interface elements, such as a control panel. The control panel is based at least in part on a template that is associated with platform 110, and the template is interpreted based on platform macro file 112. The web page may include one or more references to third party applications. For example, a hyperlink may be provided to a third party application, such as application 130 that facilitates social networking between users of platform 110. In an embodiment, rather than a hyperlink, a login form that is associated with application 130 is embedded into the web page output by platform 110.

The user may enter login information and indicate via a button or other user interface element that the user wishes to log in to application 130. A request is sent to application 130. Application 130 receives the request as user input, which may include the user's login credentials. Application then generates a web page to present to the user in response to the request. The web page may include one or more user interface elements defined in master macro file 132. For example, a control panel may be included in the web page generated by application 130. Application 130 generates the control panel based at least in part on master macro file 132. Since master macro file includes one or more wrappers in the control panel definition that reference platform macro file 112, the control panel is generated based at least in part on platform macro file 112. The web page generated by application 130 is then output to the user in response to the request. In an embodiment, the control panel generated by platform 110 and the control panel generated by application 130 look the same. In another embodiment, the control panel generated by platform 110 and the control panel generated by application 130 have attributes that are the same. In an embodiment, the attributes commonly associated with the control panel generated by platform 110 and the control panel generated by application 130 are attributes associated with platform macro file 112.

Alternative Embodiments

According to one embodiment, the techniques described herein are implemented to generate one or more user interface elements defined in platform macro file 112 without the use of wrappers. Instead of wrapping code from a third party application, a new application may be written to directly reference macros in platform macro file 112 to take advantage of the elements defined therein. Thus, an application may take advantage of platform macro file 112, even if the application contains no code to wrap, by using platform macro file 112 as its master macro file.

According to one embodiment, the information passed to platform macro file 112 may be dynamically generated. For example, the type of computing device the user is connecting with may be automatically detected, and this information may be used to populate a variable. That variable may assist platform macro file 112 in selecting user interface elements for generation.

Both of these embodiments may be implemented at the same time. For example, the front-end code of an application may include the following line:

```
[@component.module type="${mod.display}" id="${mod.id}"
title="${mod.title}" view=""/]
```

"@component.module" refers directly to a macro in platform macro file 112. Variables follow, such as the variable for the display type. These variables are used by the marco stored in platform macro file 112 to determine what is shown to the user. Values for these variables may be stored in an array such as: {"display":"changeform", "id":"12345", "title":"Change View"}. The following is an example partial code listing of platform macro file 112:

Code Listing 8 - Example Platform Macro File Code

```
[#macro module type="${type}" id="${id}" class="" style=""
title="${title}" view=""]
        [#if type=="announcement"]
            [@announcement type="${type}" id="${id}" class="" style=""
title="${title}" view=""/]
        [#elseif type=="program"]
            [@program type="${type}" id="${id}" class="" style=""
title="${title}" view=""/]
        [#elseif type=="profile"]
            [@profile type="${type}" id="${id}" class="" style=""
title="${title}" view=""/]
        [#elseif type=="schedule"]
            [@schedule type="${type}" id="${id}" class="" style=""
title="${title}" view=""/]
        [#elseif type=="news"]
            [@news type="${type}" id="${id}" class="" style="" title="${title}"
view=""/]
        [#elseif type=="whatsondeck"]
            [@whatsondeck type="${type}" id="${id}" class="" style=""
title="${title}" view=""/]
        [#elseif type=="resources"]
            [@resources type="${type}" id="${id}" class="" style=""
title="${title}" view=""/]
        [#elseif type=="video"]
            [@video type="${type}" id="${id}" class="" style=""
title="${title}" view=""/]
        [#elseif type=="classschedule"]
            [@classschedule type="${type}" id="${id}" class="" style=""
title="${title}" view=""/]
        [ #elseif type=="changeform"]
            [@changeform type="${type}" id="${id}" class="" style=""
title="${title}" view=""/]
        [#elseif type=="mobilemenu"]
            [@mobilemenu type="${type}" id="${id}" class="" style=""
```

Code Listing 8 - Example Platform Macro File Code

```
title="${title}" view=""/]
                [#elseif type=="mobilecontent"]
                [@mobilecontent type="${type}" id="${id}" class="" style=""
title="${title}" view=""/]
                [#elseif type=="mobilemenulist"]
                [@mobilemenulist type="${type}" id="${id}" class="" style=""
title="${title}" view=""/]
        [/#if]
[/#macro]
[#macro changeform type="" id="" class="" style="" title="" view=""]
<h2>${title}</h2>
<form action="ecampus.html" method="post" id="cmsForm">
    <select name="role">
        <option value="" selected="selected">--- Select a User Role ---
</option>
        <!--option value="visitingstudent">Visiting Student</option-->
        <option value="student">Student</option>
        <option value="faculty">Faculty</option>
        <option value="alumni">Alumni</option>
    </select><br /><br />
    <select name="siteid">
        <option value="" selected="selected">--- Select a School ---</option>
        <option value="sob">School of Business</option>
        <option value="ufo2">UOP eCampus</option>
        <option value="uop">Phoenix.edu</option>
    </select><br /><br />
    <input name="" type="submit" value="Submit" />
</form>
[/#macro]
```

Based on the example variable array {"display":"changeform", "id":"12345", "title":"Change View"}, the macro will detect that the changeform macro should be used to generate a form. In addition, the ${title} variable on the page that is generated will be changed to "Change View."

If the display variable were something other than changeform, then the macro with that name would be used instead. For clarity, only the changeform macro is shown as part of code listing 8. However, additional macros for other types may also be included in platform macro file 112, such as a macro for mobilemenu and mobilecontent. These macros may be used to display controls in a way that is suitable for mobile devices. Macros for specific devices, such as the Apple iPad or iPhone may also be included.

These techniques may also be used to generate controls that are forward and backwards compatible. For example, the browser, and thereby support for HTML 5, may be detected. The browser type may be passed to platform macro file 112 as a variable. Platform macro file may include code for generating separate controls that are specific to HTML 4 and HTML 5, respectively. If a browser supports HTML 5, then controls may be generated using HTML 5 markup.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
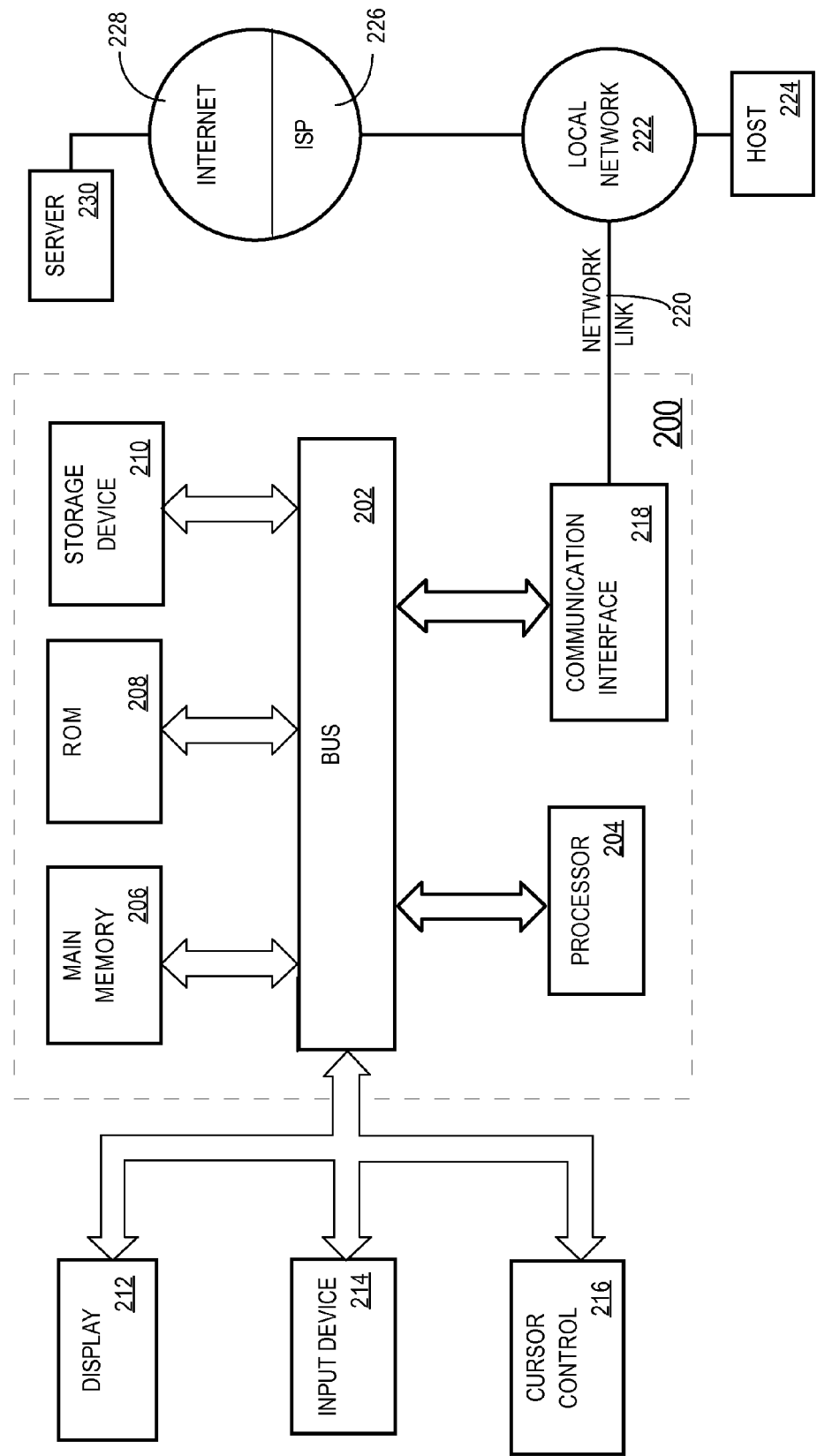
FIG. 2 illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

APPENDIX - EXAMPLE ELEMENTS

Buttons:
[@apollogrpUI.button type="edit" label="Edit"/]
Grids:
[@apollogrpUI.grid column="2" type="" id="" class=""]
    [@apollogrpUI.column type="col1" id="" class=""]
        \<p>\<strong>Column 1:\</strong> Lorem ipsum dolor sit amet, consectetuer adipiscing elit, sed diam nonummy nibh euismod tincidunt ut laoreet dolore magna.\</p>
    [/@apollogrpUI.column]
    [@apollogrpUI.column type="col2" id="" class=""]
        \<p>\<strong>Column 2:\</strong> Lorem ipsum dolor sit amet,

APPENDIX - EXAMPLE ELEMENTS consectetuer adipiscing elit, sed diam nonummy nibh euismod tincidunt ut laoreet dolore magna.</p>
    [/@apollogrpUI.column]
[/@apollogrpUI.grid]
Icons:
[@apollogrpUI.icon type="edit" title="Edit"/]
Icons With Links:
[@apollogrpUI.iconLink type="edit" id="" class="lefticon" href="#" title="Materials" label="Edit" /]
List Items:
[@apollogrpUI.iconlist type="h-list" id="" class="menulist" style=""]
    <li>[@apollogrpUI.iconLink type="syllabus" id="" class="lefticon" href="classroom/index.html" title="Materials" label="Materials" /]</li>
    <li>[@apollogrpUI.iconLink type="discussion" id="" class="lefticon" href="classroom/discussion/index.html" title="Discussion" label="Discussion" /]</li>
    <li>[@apollogrpUI.iconLink type="ebook" id="" class="lefticon" href="#" title="Get Books" label="Get Books" /]</li>
    <li>[@apollogrpUI.iconLink type="roster" id="" class="lefticon" href="#" title="Class Roster" label="Class Roster" /]</li>
[/@apollogrpUI.iconlist]
Messages:
[@apollogrpUI.message type="warning" id="" class="video-icon"]
    <h2>New Features for eCampus</h2>
    <p> University of Phoenix is committed to improving your online experience. We are continually making changes based on your feedback. <a href="whatsnew/whatsnew.html" title="Opens in a new window"><strong>Preview our upcoming changes and new feature videos.</strong></a></p>
[/@apollogrpUI.message]
Tables:
[@apollogrpUI.table type="hgrid" id="" class="thead" style="" summary="This is test"]
    [@apollogrpUI.tableHeaders]
        <th>Header</th>
        <th>Header</th>
    [/@apollogrpUI.tableHeaders]
    [@apollogrpUI.tableBody]
        <tr>
            <td>content</td>
            <td>content</td>
        </tr>
    [/@apollogrpUI.tableBody]
[/@apollogrpUI.table]
Tabs:
[@apollogrpUI.tabs type="" id="" class=""]
    [@apollogrpUI.tabitems type="active" href="/facstudent/index.html" title="Home" label="Home"/]
    [@apollogrpUI.tabitems type="" href="facstudent/classroom/index.html" title="Classroom" label="Classroom"/]
    [@apollogrpUI.tabitems type="" href"facstudent/library/index.html" title="Library" label="Library"/]
    [@apollogrpUI.tabitems type="" href="facstudent/program/index.html" title="Program" label="Program"/]
    [@apollogrpUI.tabitems type="" href="facstudent/account/index.html" title="Account" label="Account"/]
    [@apollogrpUI.tabitems type="" href="facstudent/faculty/index.html" title="Faculty" label="Faculty"/]
[/@apollogrpUI.tabs]
[@apollogrpUI.tabs type="tabset2" id="" class=""]
    [@apollogrpUI.tabitems type="active" href="#" title="Current Classes" label="Current Classes"/]
    [@apollogrpUI.tabitems type="" href="#" title="Previous Classes" label="Previous Classes"/]
    [@apollogrpUI.tabitems type="" href="#" title="Upcoming Classes" label="Upcoming Classes"/]
[/@apollogrpUI.tabs]
Panels:
[@apollogrpUI.panel type="" id="" class="" style=""]
    [@apollogrpUI.panelHeader type="" id="" class="" style=""]
    [@apollogrpUI.panelLinks id="" class="" style=""]
        [@apollogrpUI.iconLink type="edit" id="" class="lefticon" href="#" title="Materials" label="Edit" /]
    [/@apollogrpUI.panelLinks]
    [@apollogrpUI.panelTitle id="" class="" style=""]
        My Classes
    [/@apollogrpUI.panelTitle]

APPENDIX - EXAMPLE ELEMENTS

```
        [/@apollogrpUI.panelHeader]
        [@apollogrpUI.panelBody id="" class="" style=""]
                Content
        [/@apollogrpUI.panelBody]
        [@apollogrpUI.panelFooter id="" class="" style=""]
                Footer
        [/@apollogrpUI.panelFooter ]
[/@apollogrpUI.panel]
```

What is claimed is:

1. A method, comprising:

receiving, at a platform service, a first request for displaying a first web page;

wherein the first web page includes a third-party application;

generating a first transformed template based on:
  a first template,
  a first macro file that is referred to in the first template, and
  a second macro file that is referred to in the first macro file,
  wherein the first macro file refers to the second macro file via a first wrapper in the first macro file, and
  wherein the first wrapper refers to a macro identifier of a particular macro in the second macro file;

wherein the first macro file is a standard macro file for the third-party application;

wherein the first macro file defines how a particular user interface component of the third-party application should be displayed according to the third party;

wherein the particular macro in the second macro file defines how the particular user interface component of the third-party application should be displayed to exhibit a consistent look and feel with other third party applications that are accessed through the platform service;

wherein the particular macro includes one or more executable macro statements;

wherein generating the first transformed template comprises:
  generating template instructions for the particular user interface component based, at least in part, on the particular macro in the second macro file, and
  including the generated template instructions for the particular user interface component into the first transformed template; and as a response to the first request, displaying the first web page, based, at least in part, on the first transformed template to cause the particular user interface component, generated for the third-party application as part of the first web page, to exhibit the consistent look and feel with other third party applications that are accessed through the platform service;

wherein the method is performed on one or more computing devices.

2. The method of claim 1, further comprising:

receiving, at the platform service, a second request for displaying a second web page;

wherein the second web page includes a second third-party application;

generating a second transformed template based on:
  a second template,
  a third macro file that is referred to in the second template, and
  the second macro file that is referred to in the third macro file;

wherein the third macro file is a standard macro file for the second third-party application;

wherein the third macro file defines how a certain user interface component of the second third-party application should be displayed according to the second third party;

wherein the particular macro in the second macro file defines how the certain user interface component of the third-party application should be displayed to exhibit a consistent look and feel with other third party applications that are accessed through the platform service;

wherein generating the second transformed template comprises:
  generating certain template instructions for the certain user interface component based, at least in part, on the particular macro in the second macro file, and
  including the certain generated template instructions for the certain user interface component into the second transformed template; and as a response to the second request, displaying the second web page based, at least in part, on the second transformed template to cause the certain user interface component, generated for the second third-party application as part of the second web page, to exhibit the consistent look and feel with other third party applications that are accessed through the platform service.

3. The method of claim 1, further comprising:

extracting metadata from instructions for displaying the particular user interface component; and matching the first wrapper to the particular macro based, at least in part, on the metadata extracted from the instructions for displaying the particular user interface component.

4. The method of claim 3, wherein the metadata includes one or more of:
  the macro identifier;
  an element identifier;
  an element type;
  an element class;
  an element style; or
  any other element attribute.

5. The method of claim 3, wherein:

the metadata extracted from the instructions for displaying the particular user interface component comprises a first element type; and generating the template instructions for the particular user interface component comprises:
  executing a conditional statement, included in the one or more executable macro statements in the particular macro, based at least in part on the first element type;
  identifying a second macro, of a plurality of macros in the second macro file, to use in generating the template instructions for the particular user interface component based at least in part on an output of the conditional statement.

6. The method of claim 1, wherein generating the first transformed template comprises including metadata generated by the particular macro in the first transformed template.

7. The method of claim 1, wherein the generated template instructions for the particular user interface component include all metadata associated with the particular user interface component.

8. The method of claim 1, wherein:
the first wrapper replaces, in the first macro file, at least a portion of a particular type of Hypertext Markup Language (HTML) tag with a reference to a macro in the second macro file.

9. The method of claim 1, wherein:
generating template instructions for the particular user interface component comprises:
including, in the generated template instructions for the particular user interface component, an HTML tag of a particular type indicated in the first wrapper, and
including, in the generated template instructions for the particular user interface component, one or more element attributes not associated with a type of the particular user interface component in the first macro file.

10. The method of claim 1, wherein the first template does not refer to the second macro file.

11. One or more non-transitory computer-readable storage media storing instructions which, when executed by one or more processors, cause performance of:
receiving, at a platform service, a first request for displaying a first web page;
wherein the first web page includes a third-party application;
generating a first transformed template based on:
a first template,
a first macro file that is referred to in the first template, and
a second macro file that is referred to in the first macro file,
wherein the first macro file refers to the second macro file via a first wrapper in the first macro file, and
wherein the first wrapper refers to a macro identifier of a particular macro in the second macro file;
wherein the first macro file is a standard macro file for the third-party application;
wherein the first macro file defines how a particular user interface component of the third-party application should be displayed according to the third party;
wherein the particular macro in the second macro file defines how the particular user interface component of the third-party application should be displayed to exhibit a consistent look and feel with other third party applications that are accessed through the platform service;
wherein the particular macro includes one or more executable macro statements;
wherein generating the first transformed template comprises:
generating template instructions for the particular user interface component based, at least in part, on the particular macro in the second macro file, and
including the generated template instructions for the particular user interface component into the first transformed template; and
as a response to the first request, displaying the first web page, based, at least in part, on the first transformed template to cause the particular user interface component, generated for the third-party application as part of the first web page, to exhibit the consistent look and feel with other third party applications that are accessed through the platform service.

12. The one or more non-transitory computer-readable storage media of claim 11, wherein the instructions further include instructions for:
receiving, at the platform service, a second request for displaying a second web page;
wherein the second web page includes a second third-party application;
generating a second transformed template based on:
a second template,
a third macro file that is referred to in the second template, and
the second macro file that is referred to in the third macro file;
wherein the third macro file is a standard macro file for the second third-party application;
wherein the third macro file defines how a certain user interface component of the second third-party application should be displayed according to the second third party;
wherein the particular macro in the second macro file defines how the certain user interface component of the third-party application should be displayed to exhibit a consistent look and feel with other third party applications that are accessed through the platform service;
wherein generating the second transformed template comprises:
generating certain template instructions for the certain user interface component based, at least in part, on the particular macro in the second macro file, and
including the certain generated template instructions for the certain user interface component into the second transformed template; and
as a response to the second request, displaying the second web page based, at least in part, on the second transformed template to cause the certain user interface component, generated for the second third-party application as part of the second web page, to exhibit the consistent look and feel with other third party applications that are accessed through the platform service.

13. The one or more non-transitory computer-readable storage media of claim 11, wherein
the instructions further include instructions for:
extracting metadata from instructions for displaying the particular user interface component; and
matching the first wrapper to the particular macro based, at least in part, on the metadata extracted from the instructions for displaying the particular user interface component.

14. The one or more non-transitory computer-readable storage media of claim 13, wherein the metadata includes one or more of:
the macro identifier;
an element identifier;
an element type;
an element class;
an element style; or
any other element attribute.

15. The one or more non-transitory computer-readable storage media of claim 13, wherein:
the metadata extracted from the instructions for displaying the particular user interface component comprises a first element type; and generating the template instructions for the particular user interface component comprises:
    executing a conditional statement, included in the one or more executable macro statements in the particular macro, based at least in part on the first element type;
identifying a second macro, of a plurality of macros in the second macro file, to use in generating the template instructions for the particular user interface component based at least in part on an output of the conditional statement.

16. The one or more non-transitory computer-readable storage media of claim 11, wherein generating the first transformed template comprises including metadata generated by the particular macro in the first transformed template.

17. The one or more non-transitory computer-readable storage media of claim 11, wherein the generated template instructions for the particular user interface component include all metadata associated with the particular user interface component.

18. The one or more non-transitory computer-readable storage media of claim 11, wherein:
    the first wrapper replaces, in the first macro file, at least a portion of a particular type of Hypertext Markup Language (HTML) tag with a reference to a macro in the second macro file.

19. The one or more non-transitory computer-readable storage media of claim 11, wherein:
    generating template instructions for the particular user interface component comprises:
        including, in the generated template instructions for the particular user interface component, an HTML tag of a particular type indicated in the first wrapper, and
        including, in the generated template instructions for the particular user interface component, one or more element attributes not associated with a type of the particular user interface component in the first macro file.

20. The one or more non-transitory computer-readable storage media of claim 11, wherein the first template does not refer to the second macro file.

21. The method of claim 1, wherein:
    the second macro file contains instructions for displaying elements, of the first web page, that are not part of the third-party application.

22. The one or more non-transitory computer-readable storage media of claim 11, wherein:
    the second macro file contains instructions for displaying elements, of the first web page, that are not part of the third-party application.

\* \* \* \* \*